(12) United States Patent
Motoyama et al.

(10) Patent No.: US 11,665,296 B2
(45) Date of Patent: May 30, 2023

(54) IMAGE READING DEVICE

(71) Applicant: Brother Kogyo Kabushiki Kaisha, Nagoya (JP)

(72) Inventors: Toshiki Motoyama, Konan (JP); Takayuki Suzuki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/808,121

(22) Filed: Jun. 22, 2022

(65) Prior Publication Data

US 2022/0417377 A1    Dec. 29, 2022

(30) Foreign Application Priority Data

Jun. 24, 2021 (JP) .............................. JP2021-104637
Jun. 3, 2022 (JP) .............................. JP2022-090679

(51) Int. Cl.
*H04N 1/04* (2006.01)
*H04N 1/00* (2006.01)
*H04N 1/047* (2006.01)

(52) U.S. Cl.
CPC ..... *H04N 1/00708* (2013.01); *H04N 1/00599* (2013.01); *H04N 1/047* (2013.01)

(58) Field of Classification Search
None
See application file for complete search history.

(56) References Cited

U.S. PATENT DOCUMENTS

| | | | |
|---|---|---|---|
| 2002/0033973 A1* | 3/2002 | Dolan | H04N 1/00748 358/449 |
| 2009/0180155 A1 | 7/2009 | Kato et al. | |
| 2009/0185240 A1 | 7/2009 | Kato et al. | |
| 2009/0220154 A1* | 9/2009 | Daidoh | G06V 30/155 382/182 |
| 2013/0201358 A1* | 8/2013 | Sun | G06T 7/13 382/199 |
| 2016/0247262 A1* | 8/2016 | Li | G06T 3/4053 |
| 2016/0277613 A1* | 9/2016 | Hayashi | H04N 1/3872 |
| 2019/0124225 A1* | 4/2019 | Fujii | H04N 1/00718 |
| 2021/0075933 A1 | 3/2021 | Morikawa | |

FOREIGN PATENT DOCUMENTS

| | | |
|---|---|---|
| JP | 2009-164807 A | 7/2009 |
| JP | 2019-080152 A | 5/2019 |
| JP | 2021-044701 A | 3/2021 |

* cited by examiner

*Primary Examiner* — Dung D Tran
(74) *Attorney, Agent, or Firm* — Burr Patent Law, PLLC

(57) ABSTRACT

There is provided an image reading device in which a controller is configured to perform detecting, by executing an edge detection process, edge pixels from image data scanned by a reading device and stored in a storage, the edge pixels being pixels obtained by reading an edge of an original document. Then, it is determined whether a sequence of the detected edge pixels in a particular direction is interrupted. When interrupted, an expansion process is executed to increase the edge pixels in a particular range in a neighborhood of the detected edge pixels of the image data. Then, a particular process is performed on the image data using the edge pixels detected from the image data after the edge pixels are increased.

12 Claims, 12 Drawing Sheets

IMAGE READING DEVICE

REFERENCE TO RELATED APPLICATIONS

This application claims priority from Japanese Patent Application No. 2021-104637 filed on Jun. 24, 2021 and Japanese Patent Application No. 2022-090679 filed on Jun. 3, 2022, which claims domestic priority from Japanese Patent Application No. 2021-104637. The entire contents of the priority applications are incorporated herein by reference.

BACKGROUND ART

The present disclosures relate to a technique of reading an image formed on an original document as image data.

Conventionally, there has been known an image reading device that is configured to scan an original document as an image to create image data, and detect edge pixels corresponding to contours of the document from the image data.

DESCRIPTION

There is a case where it is difficult to detect the edge pixels from the outline of the original document represented by the image data. For example, depending on a manner in which the document is set on a document table or a method of edge pixel detection employed by the image reading device, there is a case where it is difficult to detect edge pixels based on the scanned outline of the document. In such a case, the edge pixels detected within image data do not correspond to the contours of the document, an image processing on the image data may not be executed appropriately.

According to aspects of the present disclosures, there is provided an image reading device which has an original document table, a reading sensor configured to read an area extending in a main scanning direction of an original document placed on the original document table and output image data representing the area extending in the main scanning direction, a conveying mechanism configured to move the original document and the reading sensor relative to each other in a sub-scanning direction which is orthogonal to the main scanning direction, a storage configured to accumulatively store the image data output by the image sensor as the original document and the reading sensor are moved relative to each other by the conveying mechanism and a controller configured. The controller is configured to perform detecting, by executing an edge detection process, edge pixels from the image data stored in the storage, the edge pixels being pixels obtained by reading an edge of the original document, determining whether a sequence of the detected edge pixels in a particular direction is interrupted, increasing, by executing an expansion process, the edge pixels in a particular range in a neighborhood of the detected edge pixels of the image data when the sequence of the edge pixels is determined to be interrupted, and performing a particular process on the image data using the edge pixels detected from the image data after the edge pixels are increased.

According to aspects of the present disclosures, there is provided an image reading device which has an original document table, a reading sensor configured to read an area extending in a main scanning direction of an original document placed on the original document table and output image data representing the area extending in the main scanning direction, a conveying mechanism configured to move the original document and the reading sensor relative to each other in a sub-scanning direction which is orthogonal to the main scanning direction, a storage configured to accumulatively store the image data output by the image sensor as the original document and the reading sensor are moved relative to each other by the conveying mechanism, and a controller. The controller is configured to perform detecting edge pixels aligned along an edge of the original document from among edge pixels by inspecting image data stored in the storage, the edge pixels being pixels obtained by reading an edge of the original document, increasing, by executing an expansion process, the edge pixels in a particular range in a neighborhood of the detected edge pixels of the image data, a number of increased edge pixels in the sub-scanning direction being greater than a number of increased edge pixels in the main scanning direction for the particular range in the expansion process, and performing a particular process on the image data using the edge pixels detected from the image data after the edge pixels are increased.

According to the above configuration, image processing can be properly performed on image data even when edge pixels that represent the edge of the original document is partially interrupted and edge pixels cannot be detected.

FIG. 1 is a block diagram showing a configuration of an image reading device.

FIG. 2 schematically shows a structure of an original document table.

FIRST EMBODIMENT

An image reading device 10 according to a first embodiment will be described with reference to the accompanying drawings.

Figure 1:
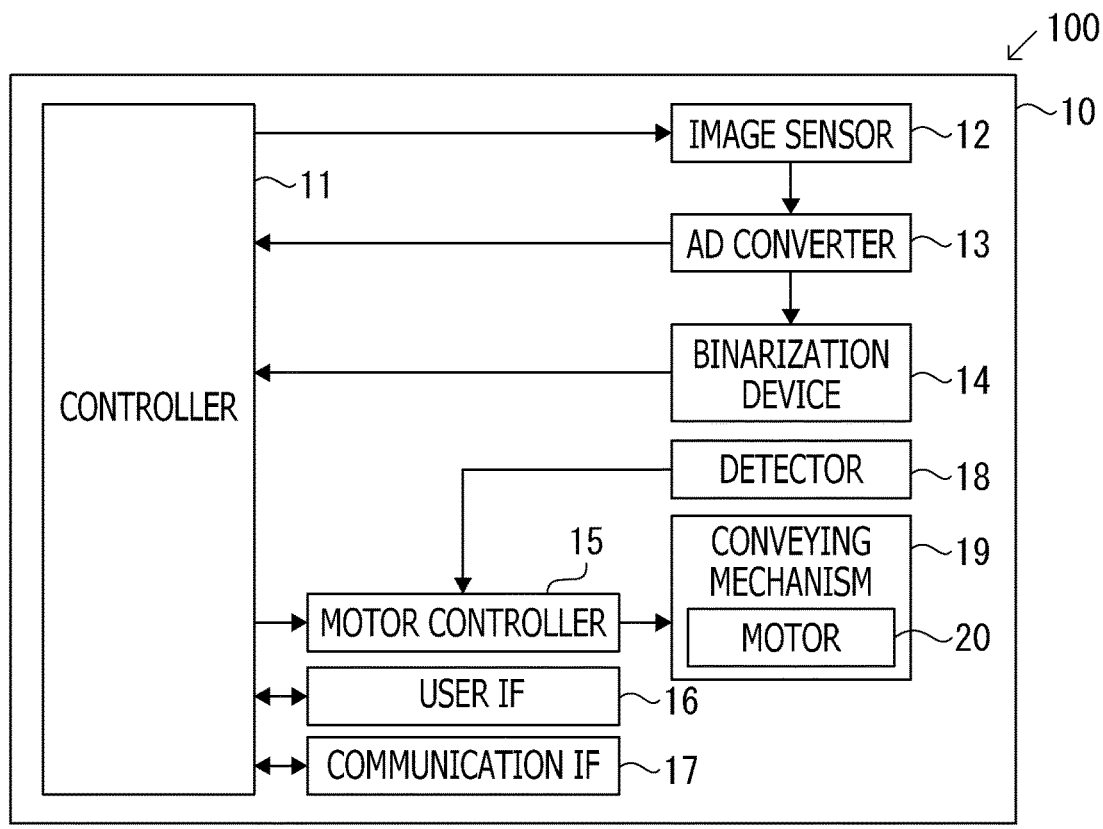

The image reading device 10 shown in FIG. 1 is a so-called flatbed type scanner. The image reading device 10 has, as shown in FIGS. 1 and 2, a controller 11, an image sensor 12, an AD converter 13, a binarization device 14, a detector 18, a conveying mechanism 19, a motor controller 15, a user IF (IF being an abbreviation of interface) 16, a communication IF 17 and an original document table 30.

Figure 2:
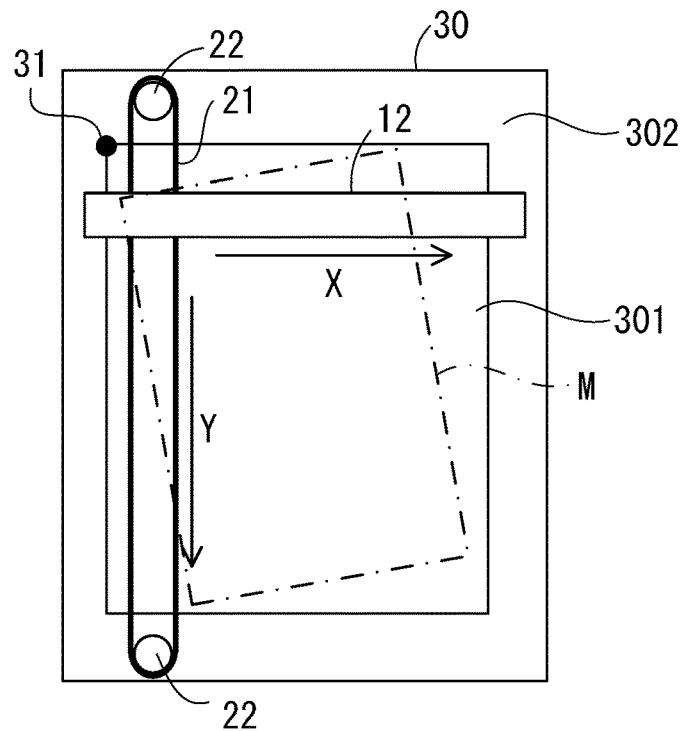

FIG. 2 shows the original document table 30 viewed from a bottom side, which is a closer side with respect a plane of FIG. 2, of the image reading device 10. The original document table 30 has a transparent platen glass 301 and a frame 302. The platen glass 301 is a planer plate member made of glass. The frame 302 is arranged to surround the platen glass 301 and is configured to support the platen glass 301. On the original document table 30, a butt position 31 is indicated. When an original document M is to be scanned, a corner of the original document M is aligned to the butt position 31. In an example shown in FIG. 2, the original document M is placed on an upper surface (i.e., a surface on a further side with respect to a plane of FIG. 2) of the platen glass 301 such that the edges of the original document M are inclined with respect to a sub-scanning direction (i.e., Y direction). In the following description, it is assumed that the original document M has a rectangular shape.

The image sensor 12 mainly includes a light source and an image reader, and is arranged such that the image reader is directed upward. According to the present embodiment, the image sensor is a contact image sensor. It is noted that the image sensor 12 is not necessarily the contact image sensor, but another one such as a CCD (charge-coupled device) image sensor may be employed. The image sensor 12 is configured to repeatedly perform a scanning operation, which is an operation of emitting light from the light source to the original document M placed on the platen glass 301, receiving reflected light which is reflected by the original document M with the scanning device, and outputting an analog signal representing a group of image data corresponding to received light amount as a serial signal. The group of analog signal output as the serial signal per each scanning operation corresponds to data representing one line of scanned image. The image sensor 12 is an elongated sensor with its extending direction being aligned with one side of the platen glass 301. In the following description, a direction in which the scanning device extends will be referred to as a main scanning direction X, and a direction perpendicular to the main scanning direction X will be referred to as a sub-scanning direction Y.

In the following description, when the original document M is set on the original document table 30, a longer edge, of two longer edges of the original document M, closer to the butt position 31 will be referred to as a left edge, and the other longer edge farther from the butt position 31 will be referred to as a right edge. Further, when the original document M is placed on the original document table 30, a shorter edge, of two shorter edges of the original document M, closer to the butt position 31 will be referred to as an upper edge, and the other shorter edge farther from the butt position 31 will be referred to as a lower edge.

The conveying mechanism 19 has a motor 20, an endless belt 21, and a pair of pulleys 22. The pair of pulleys 22 are aligned along the sub scanning direction Y with a particular interval therebetween. One pulley 22 of the pair of pulleys 22 is configured to be rotated by the motor 20. The endless belt 21 is wound around the pair of pulleys 22. Further, the image sensor 12 is secured to the endless belt 21 via a not-shown securing member. According to such a configuration of the conveying mechanism 19, depending on a rotation direction of the pulleys 22, the endless belt 21 moves one of two directions. Thus, the image sensor 12 can be reciprocally moved in the sub scanning direction Y.

The motor controller 15 performs a feedback control, based on rotating position information and speed information input by the detector 18, of a rotation of the motor 20 provided to the conveying mechanism 19 in accordance with an order from the controller 11. The detector 18 has, for example, an encoder secured to a rotation shaft of the motor 20 and a signal processing circuit configured to convert an input signal from the encoder to the rotating position information and the speed information of the motor 20.

The user IF 16 is an interface existing between the user and the controller 11. Concretely, the user IF 16 has an LCD and a touch panel arranged on the LCD. The communication IF 17 is an interface that communicatively connects an external device such as a PC (personal computer) and the image reading device 10. The communication IF 17 includes, for example, a LAN interface and a USB interface.

The controller 11 is connected to the image sensor 12, the AD converter 13, the binarization device, 14, the motor controller 15, the user IF 16, and the communication IF 17. The controller 11 is provided with a CPU, a ROM, and a RAM which are not shown in the drawings. The CPU is configured to execute processes according to programs stored in the ROM. The RAM may be configured by a flash memory or an EEPROM.

When the controller 11 receives a reading command issued by the external device via the communication IF 17 or a reading command via the user IF 16, the controller 11 starts a reading process of reading the original document M. In the reading process, the controller 11 commands the motor controller 15 to execute motor control to convey the image sensor 12 in the sub-scanning direction Y at a constant speed according to the reading resolution. Further, the controller 11 causes the image sensor 12 to perform the reading operation at regular time intervals according to the reading resolution.

The AD converter 13 performs analog-to-digital conversion of the analog data output by the image sensor 12 for each reading operation to digital image data. The controller 11 stores the converted image data output by the AD converter 13 in the RAM. Then, the controller 11 applies image processing such as gamma correction to the image data stored in the RAM. In this way, in the RAM of the controller 11, image data for a particular number of lines is accumulated in accordance with the repetition of the reading operation, and finally, image data representing the entire original document M is stored in the RAM.

The image data output by the AD converter 13 is also input to the binarization device 14 (see FIG. 1). The binarization device 14 binarizes the image data for each line and outputs the binarized data to the controller 11. The binarized image data is data in which the grayscale value of each pixel is represented by a binary value (i.e., "0" or "1"). In the following description, the binarized image data is marked with a code "D1" and the image data stored in the RAM of the controller 11 without being binarized is marked with a code "D2" to distinguish between the two types of data. The image data D1 binarized by the AD converter 13 is output to the controller 11. As the controller 11 stores the image data D1 in the RAM, the binarized image data D1 representing the entire original document M is stored in the RAM. In the following description, an image represented by the image data D1 is also referred to as the "image data D1."

Next, a process performed by the controller 11 to detect a size of the original document M and an inclination of the original document M, in addition to the reading of the original document M, will be described with reference to FIG. 3.

Figure 3:
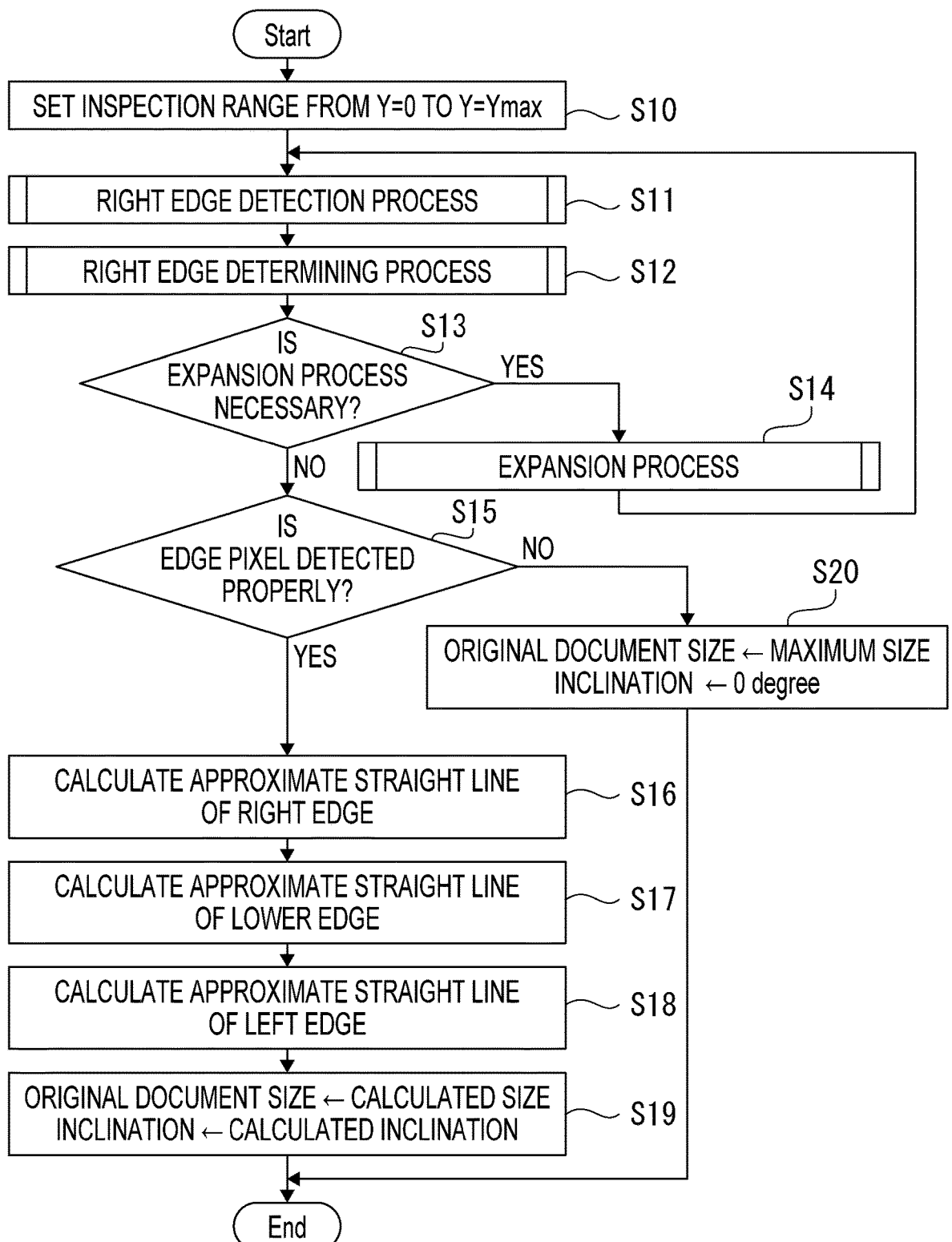
FIG. 3 is a flowchart illustrating an edge detecting process.

FIG. 3 shows the process executed by the controller 11. In S10, the controller 11 sets an inspection range for detecting edge pixels from the image data D1 stored in the RAM.

Figure 4:
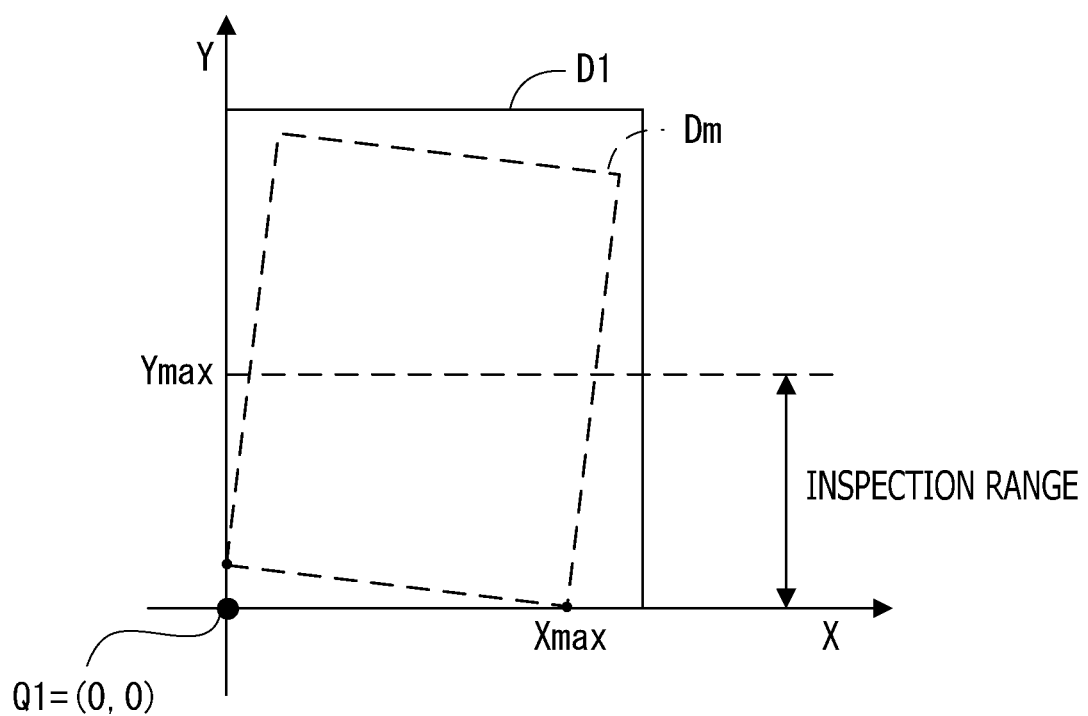
FIG. 4 illustrates a configuration of image data.
Figure 5:
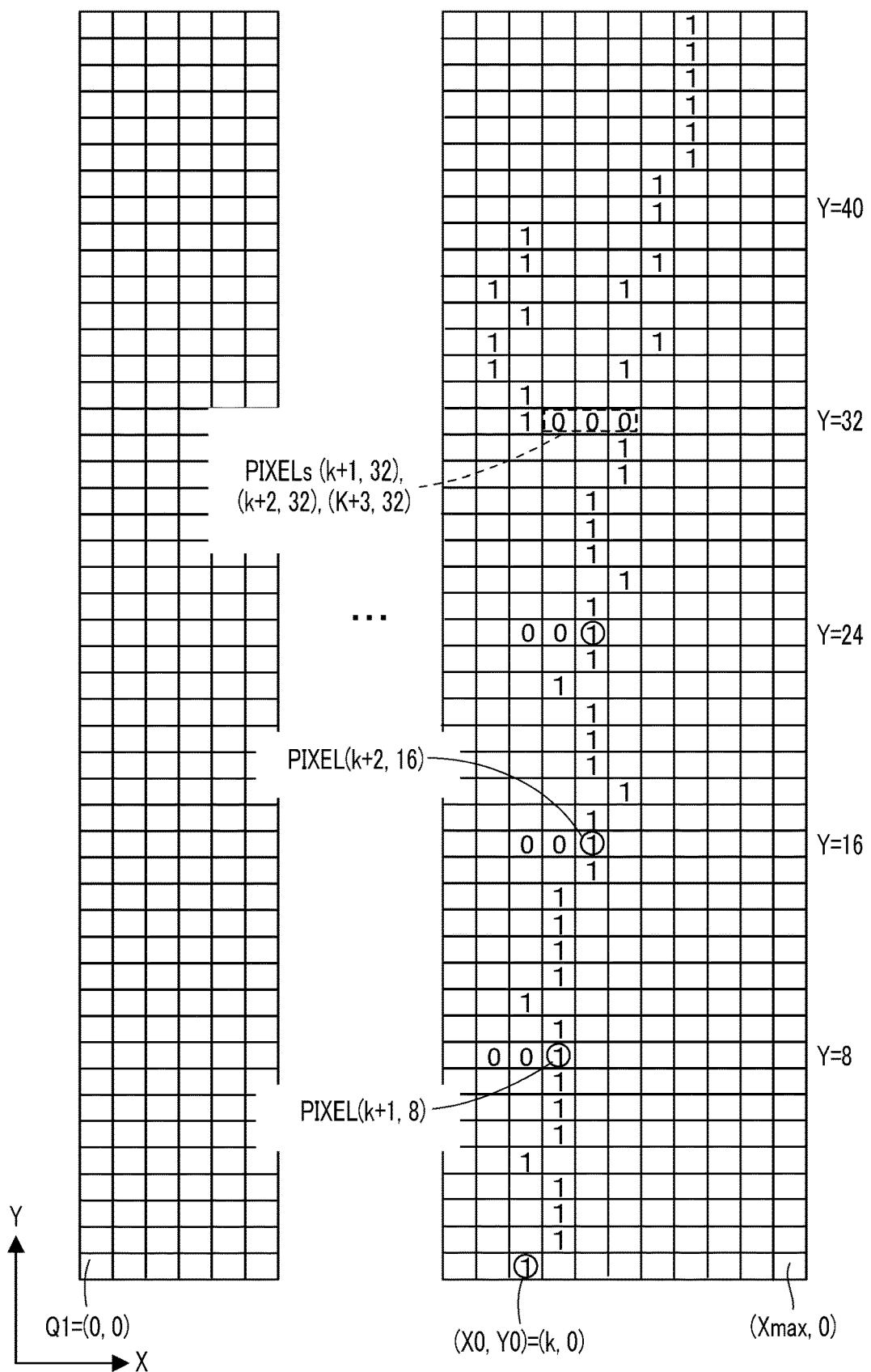
FIG. 5 illustrates an example of pixel values of a part of the image data.

FIG. 4 shows an image of the entire platen glass 301 read by the image sensor 12, represented by the binarized image data D1, and stored in the RAM. For the sake of explanation, the image represented by the binarized image data D1 is also indicated with the code "D1." In the image data D1, an origin Q1 is a pixel corresponding to the butt position 31 of the original document table 30. An original document area Dm is an area constituted by pixels, among the image data D1, obtained by reading the original document M set on the original document table 30. FIG. 5 mainly shows binarized values of the pixels of the image data D1, especially those obtained by reading a right edge of the original document M. It is noted that, in FIGS. 4 and 5, the image data D1 which is obtained when the corner of the original document M is shifted from the butt position 31 defined on the original document table 30 is shown. In other words, the image data D1 which is obtained when the original document M is inclined with respect to the main scanning direction X and the sub-scanning direction Y is shown in FIGS. 4 and 5.

As shown in FIG. 4, an inspection target is the binarized image data D1 of the scanned image in the inspection range defined by the start position of scanning by the image sensor 12 on the original document table 30 to the position where the image sensor 12 advances a few centimeters (e.g., 3 cm) in the sub-scanning direction Y. The image data D1 corresponding to the scanning start position corresponds to the image data along a line passing the origin Q1 and extending in a direction parallel to the main scanning direction X. In the present embodiment, edge pixels are not detected in the entire range of image data D1, but are detected in the inspection range, which is a particular range from the origin Q1 in the sub-scanning direction Y. Concretely, the upper limit of the inspection range in the sub-scanning direction Y is set as Ymax.

In S11, a right edge detection process is performed for the inspection range set in S10. The right edge detection process is a process to detect edge pixels obtained by reading the right edge of the original document M in the original document area Dm, which is included in the image data D1. In the following description, the edge pixels obtained by reading the edge of the original document M are also referred to as side edge pixels, and concretely, the side edge pixels obtained by reading the right edge of the original document M are also referred to as right edge pixels. It is noted that a process executed by the controller 11 at S11 is an example of an edge detection process.

Figure 6A:
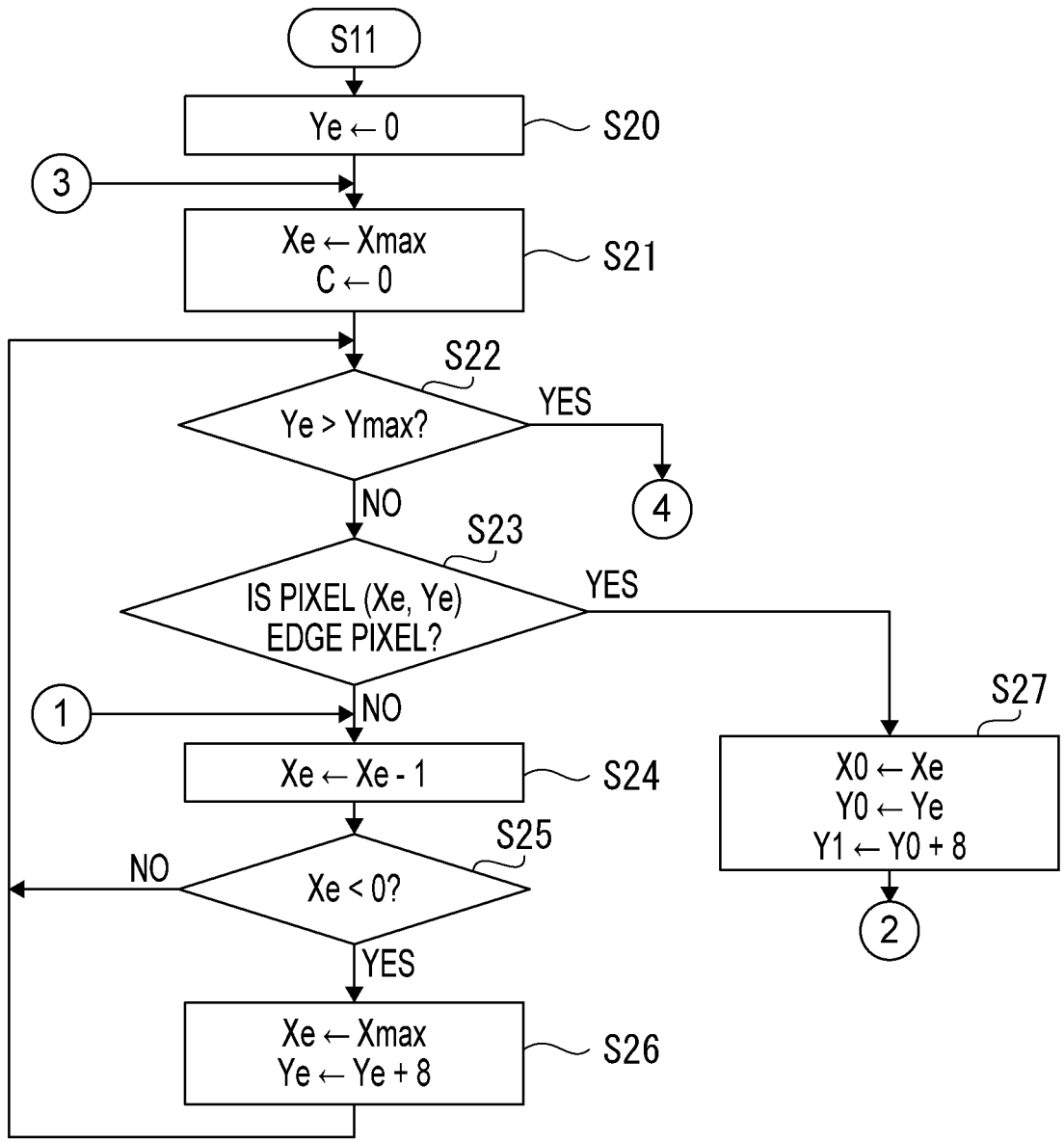
FIGS. 6A and 6B show a flowchart illustrating a right edge detecting process.
Figure 6B:
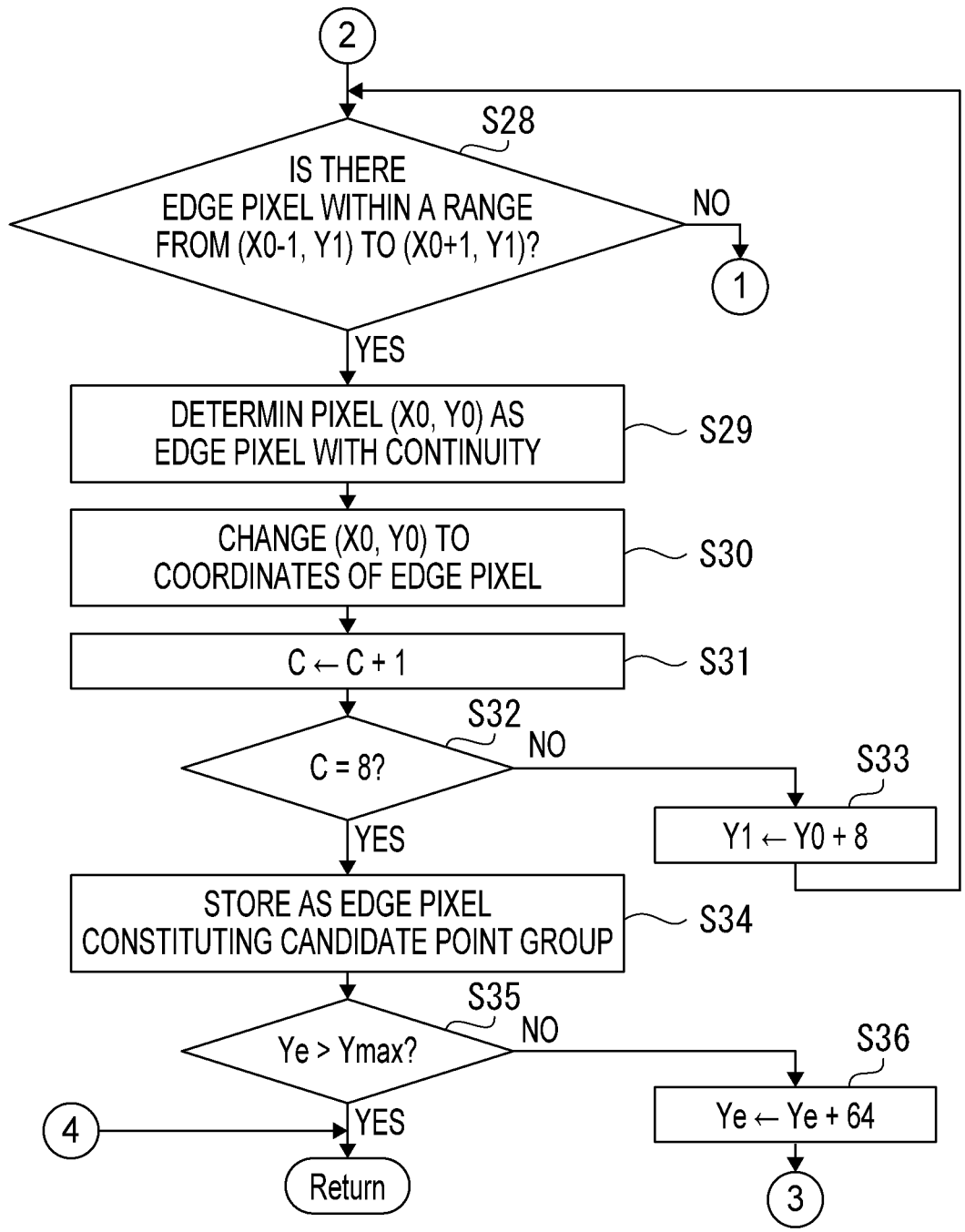

FIGS. 6A and 6B show a flowchart illustrating the right edge detection process which is performed in S11 of the process shown in FIG. 3. In S20, an inspection position Ye in the sub-scanning direction (hereinafter, referred to as a sub-scanning direction inspection position) is set to zero (0). The sub-scanning direction inspection position Ye is a coordinated in the sub-scanning direction Y among coordinates designating a pixel subjected to inspection of the edge pixels. In S21, an inspection position Xe in the main scanning direction (hereinafter, referred to as a main scanning direction inspection position) is set to "Xmax" and variable C is initialized to zero (0). The main scanning direction inspection position Xe is a coordinate in the main scanning direction X among coordinates designating a pixel subjected to inspection of the edge pixels. The pixel at "Xmax" is the farthest pixel from the origin Q1 in the main scanning direction X. In the present embodiment, in order to detect the right edge pixels in the original document area Dm, the initial value of the inspection position Xe in the main scanning direction is set to "Xmax," which is the rightmost pixel in the image data D1. The variable C will be described later.

In S22, whether the sub-scanning direction inspection position Ye is greater than Ymax, i.e., whether the sub-scanning direction inspection position Ye exceeds the inspection range or not. When it is determined that the sub-scanning direction inspection position Ye does not exceed the inspection range (S22: NO), the process advances to S23. In S23, for a pixel subjected to be inspected, which is specified by the main scanning direction inspection position Xe and the sub-scanning direction inspection position Ye, it is detected whether the pixel is the edge pixel or not. Concretely, when the grayscale value of the pixel to be inspected (hereinafter, referred to as an inspection target pixel) is "1," the pixel is determined to be an edge pixel, while when the grayscale value to be inspected is "0," the pixel is determined not to be an edge pixel.

When the inspection target pixel is not the edge pixel (S23: NO), the process advanced to S24. In S24, the controller 11 changes the inspection target pixel from the current pixel to a pixel on a minus side pixel in the main scanning direction X by one pixel by subtracting one from the main scanning direction inspection position Xe. In S25, the controller 11 determines whether the current inspection position Xe in the main scanning direction is less than 0, i.e., whether the inspection position Xe in the main scanning direction exceeds the inspection range. When the current inspection position Xe in the main scanning direction is equal to or greater than zero (0) (S25: NO), the process advances to S22.

When it is determined that Xe (i.e., the X coordinate of the current inspection position) is equal to or greater than 0 (S25: NO), the process proceeds to S22. Then, when it is determined that Ye (i.e., the Y coordinate of the inspection position) is less than Ymax (S22: NO), the process advances to S23 to determine whether the new inspect target pixel (Xe, Ye) is the edge pixel. Unless an edge pixel is detected among the pixels aligned on the current inspection position Ye in the sub-scanning direction (S23: NO), the target inspection pixel is changed to another one by decrementing the X coordinate by one (S24), and the determination whether the new target inspection pixel is the edge pixel is determined (S24, S25, S22, and S23). During the above inspection of which Y coordinate in the sub-scanning direction is Ye, when the X coordinate of the inspection position becomes zero or less (S25: YES), the process advances to S26.

In S26, the target inspection position is changed by setting the X coordinate Xe of the target inspection position to "Xmax" and the Y coordinate Ye of the target inspection position to "Ye+8." That is, the target inspection pixel is changed from a pixel of which Y coordinate is Ye to a pixel of which Y coordinate is shifted on a positive side, in the sub-scanning direction, by eight pixels. In the example shown in FIG. 5, when the current inspection position in the sub-scanning direction Ye is a pixel of which Y coordinate is zero (i.e., Y=0), the target inspection position in the sub-scanning direction Ye after the change is a pixel of which Y coordinate is eight (i.e., Y=8). After executing S26, the process advances to S22.

When it is determined that the current inspection position of which Y coordinate in the sub-scanning direction Ye is equal to or less than Ymax (S22: NO), it is determined whether a pixel of which position in the sub-scanning direction is Ye after changed is the edge pixel (S23-S26). When the target inspection pixel is determined to be the edge pixel (S23: YES), the process advances to S27. In S27, the X and Y coordinates of the pixel of interest (i.e., X0 and Y0) are changed such that X0 is set to the X coordinate Xe of the current inspection position and the Y0 is set to the Y coordinate Ye of the current inspection position. Further, an extended position Y1 in the sub-scanning direction is set to "Y0+8." The pixel in question (X0, Y0) is a pixel to be designated as a reference pixel when it is determined whether the pixel, which is determined to be the edge pixel in S23, has continuity on the image data D1. Specifically, by executing the processes from S27 to S33 described below, it is determined whether or not the pixel of interest (X0, Y0) and the other pixels consecutively arranged at predetermined intervals (every 8 pixels in this embodiment) in the sub-scanning direction Y relative to this pixel (X0, Y0) form a candidate point group Gn. The example in FIG. 5 shows a case where the pixel of interest (X0, Y0) of which inspection position in the sub-scanning direction Ye is zero and which shows a circled value "1" (i.e., the pixel of interest (X0, Y0) of which coordinates are (k, 0)) is an edge pixel. By detecting edge pixels on the right edge in units of candidate point groups Gn, which are collections of multiple edge pixels, it is more likely than a case where edge pixels are detected in units of a single pixel, that dust and the like are not mistakenly detected as outlines of the original document M.

In S28, it is determined whether or not an edge pixel constituting a candidate point group Gn exists for the pixels (X0-1, Y1), (X0, Y1), and (X0+1, Y1) surrounding the pixel of interest (X0, Y0) according to a particular priority order. In the present embodiment, to detect edge pixels on the right edge of the original document area Dm, whether edge pixels are present or not is determined in the priority order of pixels (X0+1, Y1), (X0, Y1), and (X0-1, Y1). For example, when pixel (X0+1, Y) is determined to be an edge pixel, the edge pixel detection is not performed for the remaining pixels. In the example in FIG. 5, for the pixel of interest (X0, Y0) of which the coordinates are (k, 0), the surrounding pixels (k+1, 8) showing circled values are determined to be edge pixels. The surrounding pixels that are not determined to be edge pixels are given a value "0" to indicate that they are not edge pixels. When it is determined that there is an edge pixel within a range from (X0-1, Y1) to (X0+1, Y1) (S28: YES), the process advances to S29, and the pixel of interest (X0, Y0) is determined as an edge pixel with continuity.

For example, if there are edge pixels in the surrounding pixels (X0+1, Y1) (S28: YES), the controller 11 regards that there are edge pixels arranged from the pixel of interest (X0, Y0) to the surrounding pixels (X0+1, Y1) and determines the pixel of interest (X0, Y0) as an edge pixel with continuity (S29: YES).

In S30, the coordinates of the current pixel of interest (X0, Y0) are changed to the coordinates of the edge pixel detected according to the priority order in S28. In the example in FIG. 5, pixel (k+1, 8) is determined to be an edge pixel, and the coordinates of the current pixel of interest (X0, Y0) are changed to (k+1, 8).

In S31, the variable C is incremented by one. The variable C is a variable that indicates the number of edge pixels included in the candidate point group. In the present embodiment, the variable C takes values from 0 to 8, since the candidate point group includes eight edge pixels. In S32, it is determined whether the variable C is eight. In other words, in S32, it is determined whether all the edge pixels constituting on candidate point group have been detected.

When it is determined that the variable C is eight (S32: YES), the process proceeds to S33. In S33, the extended position in the sub-scanning direction Y1 is changed to a position advanced with respect to the current inspection position Ye (i.e., Y0) in the sub-scanning direction, on the plus side by eight pixels amount. After execution of S33, the process proceeds to S28 and determines whether each of the pixels surrounding the pixel (X0, Y0) of interest is an edge pixel in accordance with the priority order. By executing such a process, the controller 11 detects edge pixels constituting a candidate point group at every 8 pixels in the sub-scanning direction Y with respect to the pixel of interest (X0, Y0).

When it is determined that there is no edge pixel constituting the candidate point group Gn among the pixels (X0-1, Y1), (X0, Y1), and (X0+1, Y1) surrounding the pixel of interest (X0, Y0), the controller 11 proceeds to S24 and changes the inspection position Xe in the main scanning direction, which specifies the position of the pixel to be inspected in the main scanning direction X, to the minus side by one pixel. In this case, since the pixel of interest (X0, Y0) designated in S27 is not determined to be the edge pixel with the continuity, the determination of whether the edge pixel or not is performed on a new target inspection pixel. When the new target inspection pixel is determined to be the edge pixel (S23: YES), detection of edge pixels constituting the candidate point group is performed using the thus determined edge pixel as the new pixel of interest. In the example of FIG. 5, since none of the pixels (k+1, 32), (k+2, 32), and (k+3, 32) is the edge pixel, a negative decision is made in S28.

Next, the process proceeds to S32. When the variable C is eight (S32: YES), the process proceeds to S34. In S34, the coordinates of each edge pixel from variable C=1 to variable C=8 are stored in the RAM as pixels constituting the candidate point group. The controller 11 stores the candidate point group G firstly stored in the RAM is the candidate point group G1, and every time when the controller 11 stores the candidate point group in the RAM, they are stored as candidate point groups G2, G3, . . . GN-1, and GN in the RAM. It is noted that an affix "n" of the candidate point group Gn is an identifier of the candidate point group, and is an integer equal to or greater than one, while equal to or less than N.

In the example shown in FIG. 5, the controller 11 determines that three pixels (k, 0), (k+1, 8) and (k+2, 16) the edge pixels with the continuity. On the other hand, the controller 11 does not determine that pixel (k+2, 24) is an edge pixel with the continuity. In the example shown in FIG. 5, the controller 11 determines that the first through third pixels at every 8 pixels in the sub-scanning direction are edge pixels with continuity, while the fourth pixel, which is pixel (k+2,24), is not determined to be an edge pixel with continuity and does not store the pixels in the RAM as edge pixels that constitute a candidate point group at S34.

When the controller 11 repeated the process from S28 to S32 eight times, that is, when the controller 11 has determined eight consecutive times that the edge pixels have continuity (S32: YES), the controller 11 stores the coordinates of each edge pixel from variable C=1 to 8 in the RAM as pixels that constitute a group of candidate points.

Figure 8:
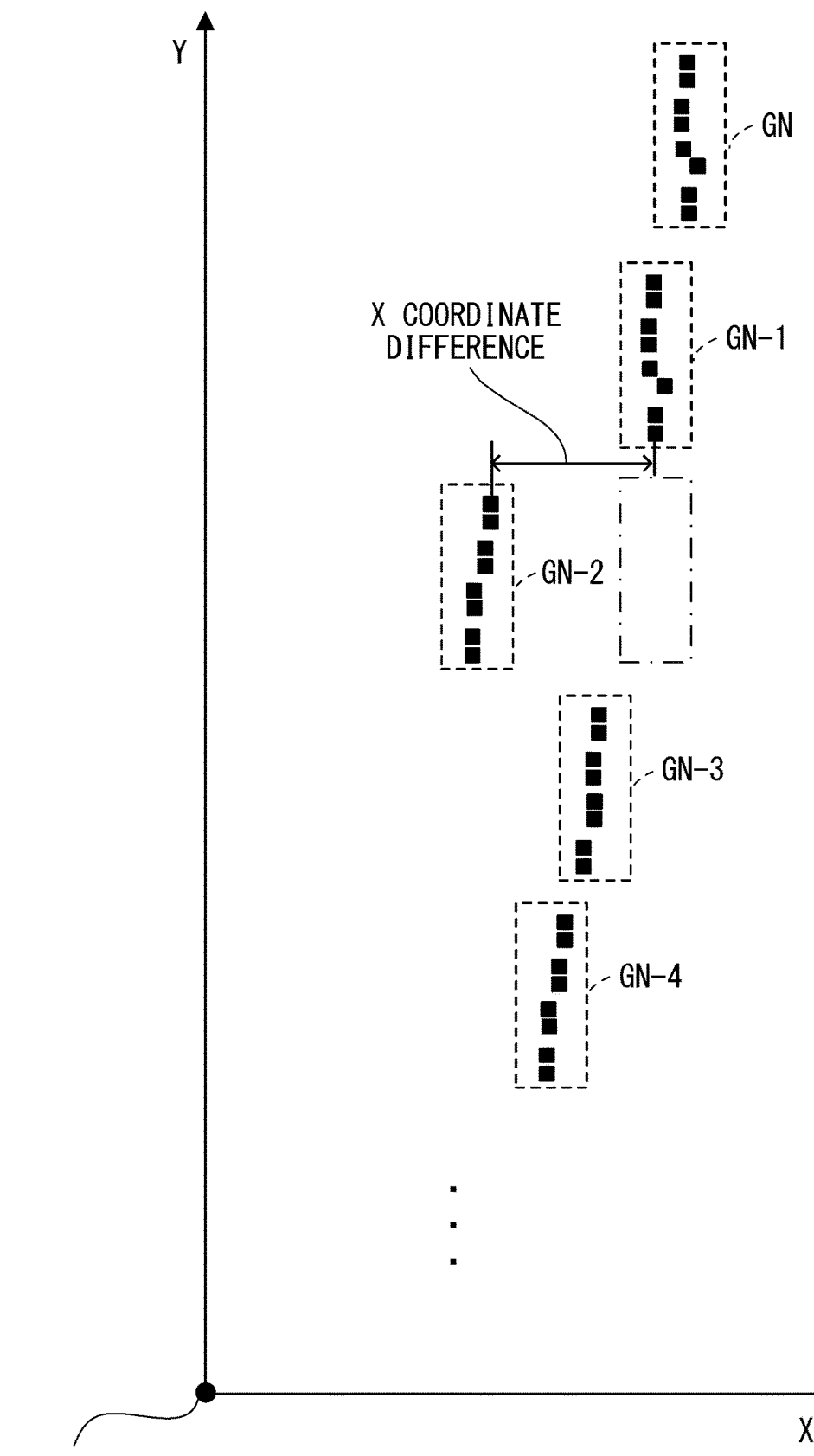
FIG. 8 illustrates a candidate dot group.

FIG. 8 shows the candidate point group Gn in a binarized image data D1 of the right edge of the original document M. The candidate point groups GN-4, GN-3, GN-1, and GN in FIG. 8 indicate that the edge pixels are located along the right edge of the original document M. However, the detection of the edge pixels on the right edge of the original document M is interrupted at a box indicated by single-dotted lines in FIG. 8.

The black square dots shown in FIG. 8 indicate edge pixels that were determined to be edge pixels with continuity in S29. The candidate point group Gn contains eight edge pixels with continuity and corresponds to the coordinates of each edge pixel from variable C=1 to 8. Spaces between the black square dots in the candidate point group Gn indicate that the edge pixels exist consecutively.

It is noted that, in the example shown in FIG. 8, the controller 11 does not detect a candidate point group Gn in a box indicated by sing-dotted lines, but detects a candidate point group GN-2 which contains edge pixels of a line on an inner side with respect to the right edge of the original document M. In this example, unlike the example shown in FIG. 5, the controller 11 was unable to determine, eight consecutive times, edge pixels with continuity in the box indicated by the single-doted lines and the controller 11 did not store the same as the edge pixels constituting a candidate point group in the RAM at S34.

In S35, the controller 11 determines whether the inspection position Ye in the sub-scanning direction is greater than the upper limit Ymax. When it is determined that the inspection position Ye in the sub-scanning direction is equal to or less than the upper limit Ymax (S35: NO), the process proceeds to S36. In S36, to change the pixel to be inspected, the controller 11 changes the inspection position Ye in the sub-scanning direction to the plus side by 64 pixels in the sub-scanning direction Y. On the other hand, when it is determined that the inspection position Ye in the sub-scanning direction is greater than the upper limit Ymax (S35: YES), since the inspection position Ye in the sub-scanning direction exceeds the inspection range, the controller 11 makes a positive decision in S35 and terminates the process in FIG. 6. In this case, the process proceeds to S12 in FIG. 3.

In S12, the right edge judgment process is performed on the right edge pixels detected in S11. The right edge determining process is a process that mainly determines whether the right edge pixels detected in S11 are interrupted in the sub-scanning direction Y or not. The process performed by controller 11 in S12 is an example of an interruption determining process.

Figure 7:
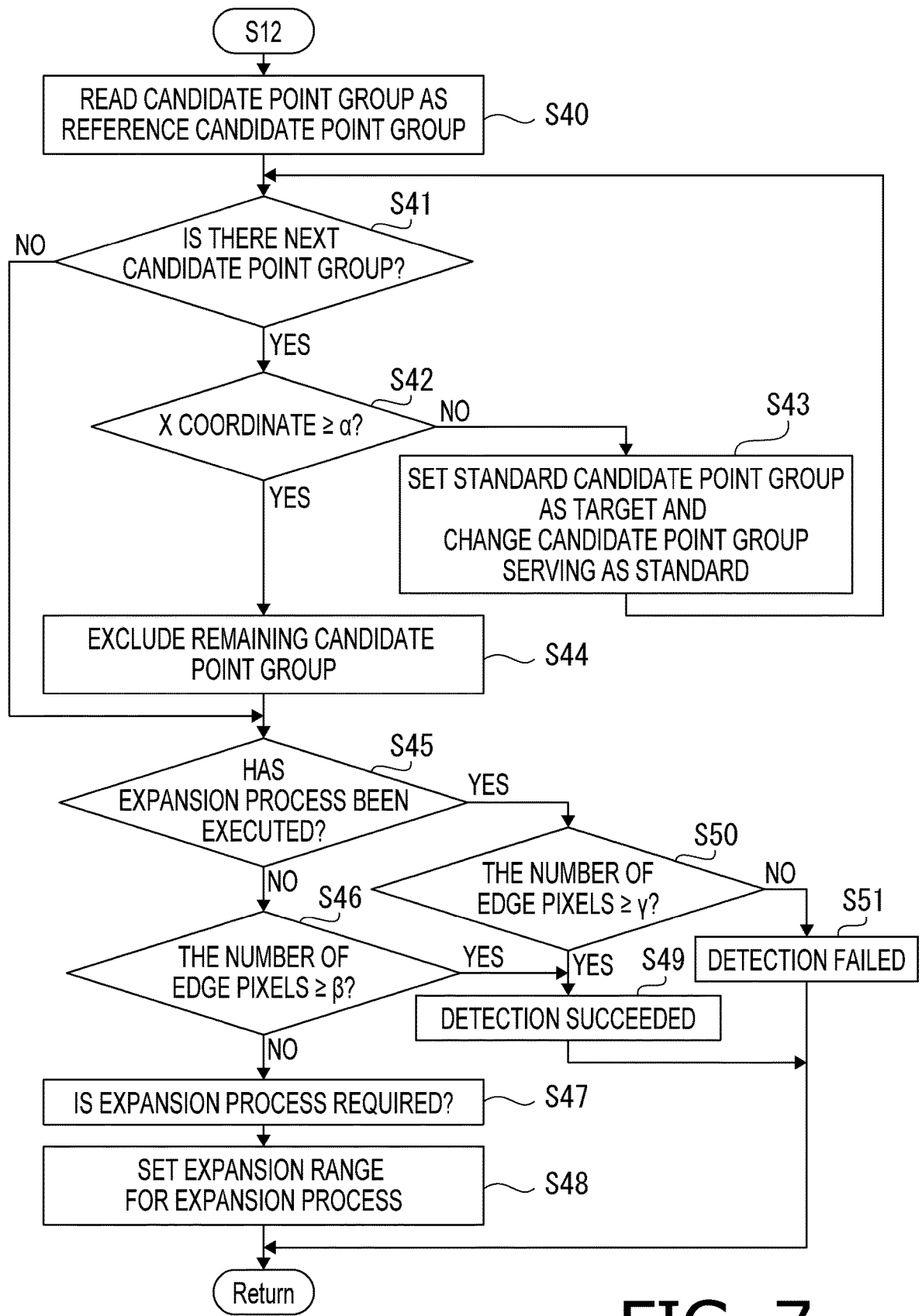
FIG. 7 is a flowchart illustrating a right edge determining process.

FIG. 7 is a flowchart showing the right edge determining process in S12 in detail. In S40, among the candidate point groups G1, ..., and GN, which are bundles of edge pixels stored in the RAM, the candidate point groups are read out as criteria for determining the interruption of the right edge pixels. As shown in FIG. 8, after the execution of S11, the RAM stores the coordinates of the edge pixels, a set of 8 pixels constituting the candidate point group Gn. In S40, among the candidate point groups G1, ..., and GN stored in the RAM (candidate point groups GN-4, GN-3, GN-2, GN-1, GN in the example in FIG. 8), the candidate point group GN that contains the edge pixel with the largest coordinate in the sub-scanning direction Y is read out as the reference candidate point group Gn. It is note that the value of n in S40 is N.

In S41, the controller 11 determines whether the next candidate point group Gn−1 exists with respect to the reference candidate point group Gn in S40. In the example in FIG. 8, with respect to the candidate point group GN, a candidate point group GN-1 adjacent thereto in the sub-scanning direction Y is the next candidate point group. When it is determined that there exists the next candidate point group Gn−1 (S41: YES), the process proceeds to S42.

In S42, the controller 11 determines whether or not the X coordinate difference between the reference candidate point group Gn and the next candidate point group Gn−1 determined in S41 is equal to or greater than the threshold value α. The "X coordinate difference" is a value of the difference in X coordinates between the edge pixel with the smallest coordinate in the sub-scanning direction Y in the reference candidate point group Gn and the edge pixel with the largest coordinate in the sub-scanning direction Y in the next candidate point group Gn−1. That is, in S42, the controller 11 determines whether the right edge pixels obtained by reading the right edge of the original document M are interrupted.

When it is determined that the X coordinate difference is less than α (S42: NO), the process proceeds to S43. In S43, the controller 11 changes the reference candidate point group Gn to the candidate point group Gn−1 that is on the minus side, by one, in the sub-scanning direction Y. In the example in FIG. 8, when the current reference candidate point group Gn is the candidate point group GN, then the candidate point group GN−1 is the reference candidate point group Gn. After the execution of S43, the process proceeds to S41. Then, with respect to the newly set reference candidate point group Gn, the processes S41 and S42 are performed.

When it is determined that the X coordinate difference is equal to or greater than a (S42: YES), the process proceeds to S44. In the example in FIG. 8, the X coordinate difference between the next candidate point group GN−2 and the reference candidate point group GN−1 is equal to or greater than the threshold value α. In S44, controller 11 excludes candidate point groups G1, G2, . . . , Gn−1, which are located on the minus side in the sub-scanning direction Y from the current candidate point group GN. In the example in FIG. 8, the controller 11 excludes the candidate point groups G1, G2, GN-3, and GN-2 from the candidate point groups G1, G2, . . . , GN-1, and GN.

In S45, the controller 11 determines whether the expansion process has already been executed in S43 for the candidate point groups Gn, Gn+1, . . . , and GN currently stored in the RAM. The determination of whether or not the expansion process has already been executed in S43 is made using the value of the first determination flag set in S47, which is described below. When the expansion process has not been executed (S45: NO), the process proceeds to S46.

In S46, the controller 11 determines whether the total number of edge pixels with continuity in the set of candidate point groups Gn, Gn+1, . . . , and GN is greater than or equal to a first constant β. In the example in FIG. 8, the controller 11 determines whether the total number of edge pixels with continuity in the set of candidate point groups GN, GN-1 is greater than or equal to the first constant β The first constant β is determined from the number of edge pixels with continuity that are assumed to improve the accuracy of the approximate line when calculating the approximate line of the right edge pixel of the original document M using the edge pixel. When it is determined that the total number of edge pixels with continuity in the set of candidate point groups Gn, Gn+1, . . . , and GN is less than the first constant β (S46: NO), the process proceeds to S47. In S47, the controller 11 sets the first determination flag to a value indicating that the expansion process is required. The first determination flag is a flag indicating whether or not the expansion process is necessary, and the value of the first determination flag is cleared when the expansion process is executed in S14, which is described later.

Figure 9:
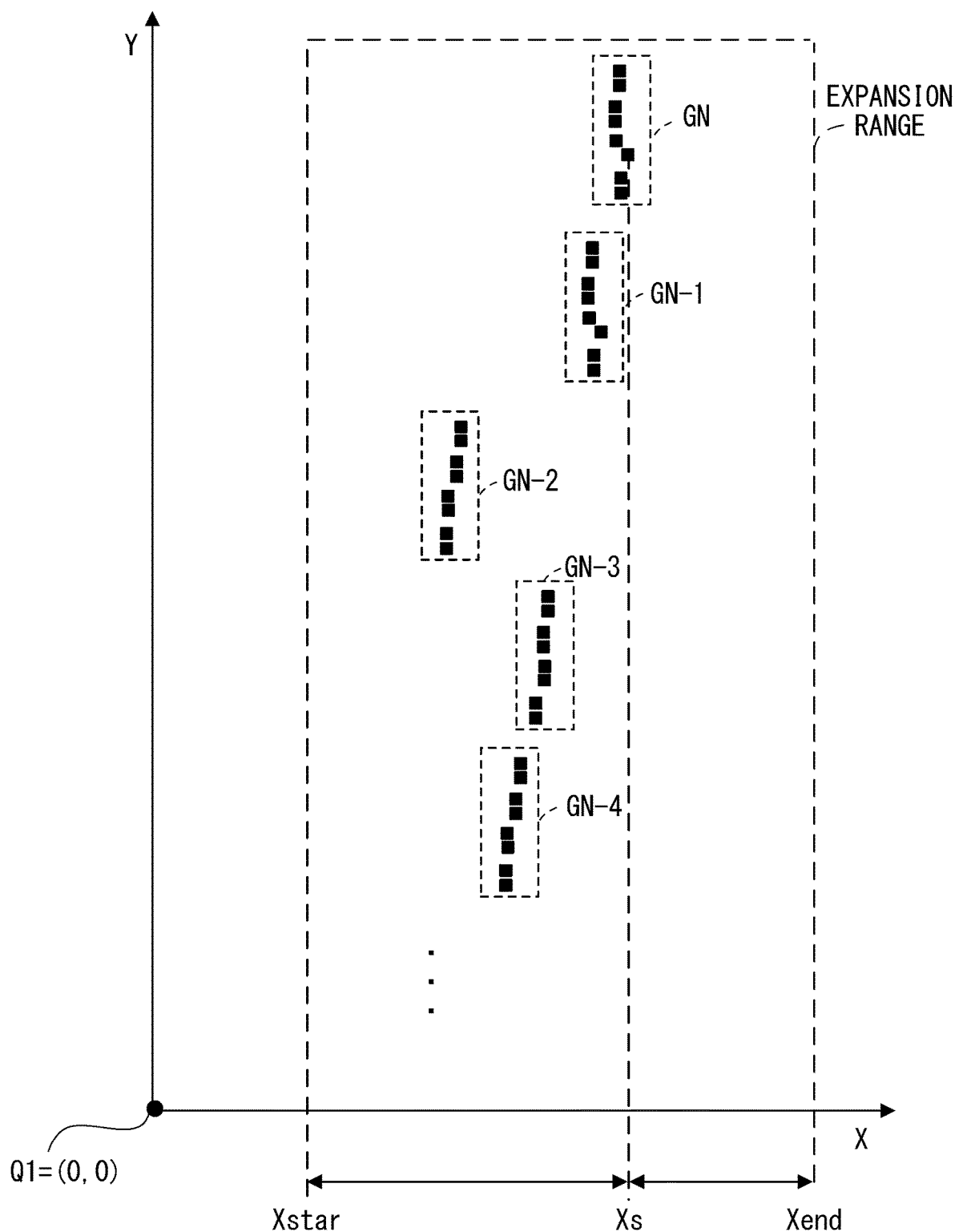
FIG. 9 illustrates a range of a dilation process.

In S48, the controller 11 sets the expansion range for the expansion process on the image data D1. Concretely, the controller 11 sets the range from "Xstar" to "Xend" in the main scanning direction X in the inspection range as the expansion range. As shown in FIG. 9, "Xstar" is a pixel that is on the minus side from the reference coordinate Xs by a predetermined number of pixels in the main scanning direction X. The reference coordinate Xs is the edge pixel having the largest coordinate value in the main scanning direction X among the edge pixels in the candidate point groups Gn, Gn+1, . . . , and GN. For example, the "Xstar" is a pixel that has advanced to the minus side by 32 pixels from the reference coordinate Xs. The "Xend" is a pixel that has advanced from the reference coordinate Xs to the plus side by a particular number of pixels in the main scanning direction X. For example, "Xend" is a pixel that has advanced to the plus side by 16 pixels from the reference coordinate Xs.

When it is determined that the total number of edge pixels with continuity in the set of candidate point groups Gn, Gn+1, . . . , and GN is equal to or greater than the first constant β (S46: YES), the process proceeds to S49. In S49, the controller 11 sets the second determination flag to a value indicating that the right edge pixel in the original document area Dm has been properly detected. The value of the second determination flag is cleared when the process in FIG. 3 is completed. When the total number of the edge pixels with continuity in the set of candidate point groups Gn, Gn+1, . . . , and GN is greater than or equal to the first determining constant β, an approximate line with a predetermined accuracy can be calculated using these edge pixels. Therefore, in such cases, the expansion process is not performed. After the execution of S48 or S49, the process proceeds to S13 of FIG. 3. A case where a positive decision is made in S45 will be described later.

In S13 of FIG. 3, the controller 11 determines whether or not the expansion process is necessary for the edge pixels according to the value of the first determination flag set in S12. When the first determination flag is a value indicating that the "expansion process is required" (S13: YES), the process proceeds to S14. On the other hand, when the first determination flag does not indicate that the "expansion process is required" (S13: NO) as the positive decision is made in S46 of FIG. 7, the process proceeds to S15.

Figure 10:
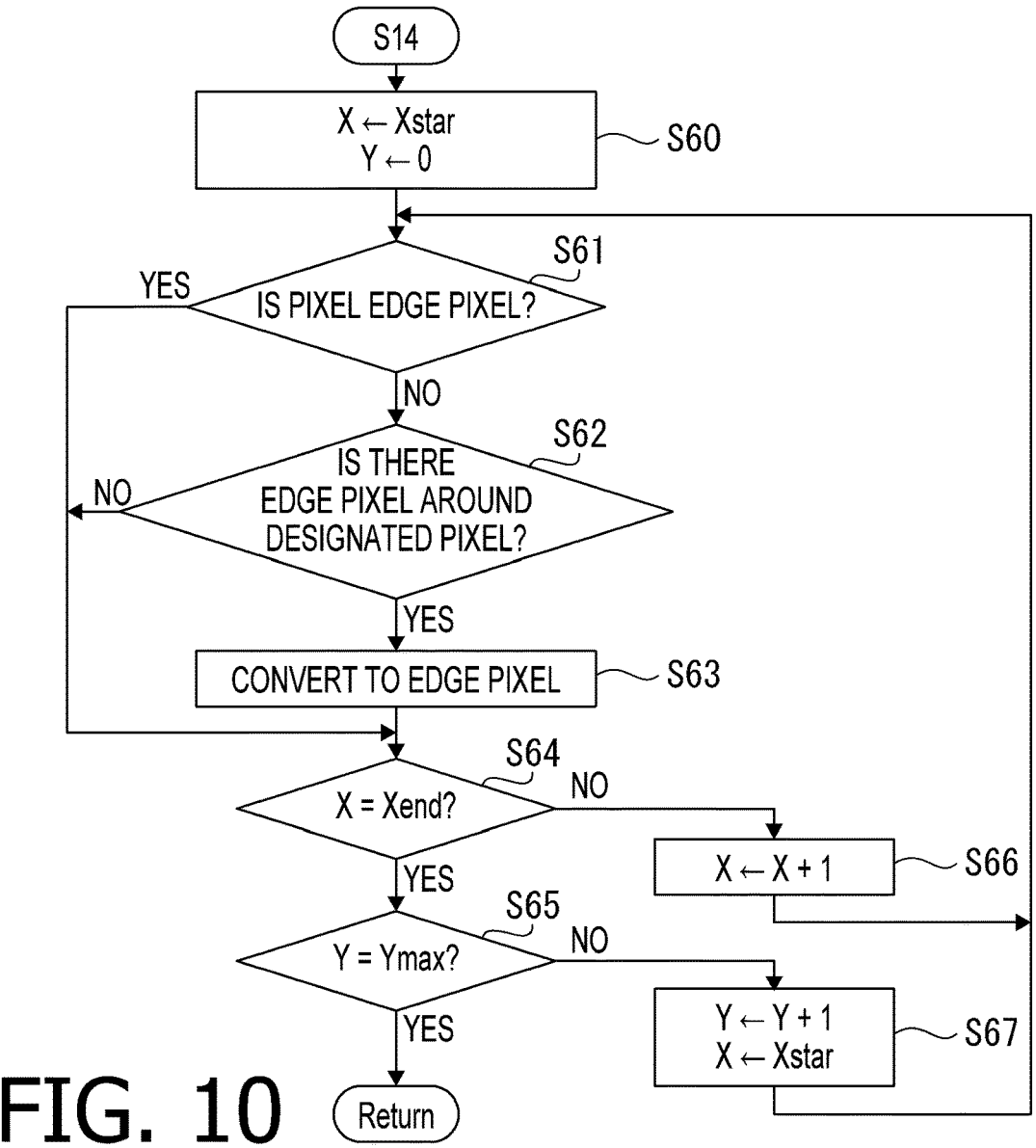
FIG. 10 is a flowchart illustrating the dilation process.

In S14, the controller 11 executes the expansion process. The expansion process is a process of increasing the edge pixels around the edge pixel detected from the image data D1. FIG. 10 is a flowchart illustrating the expansion process performed in S14. In S60, as the starting point of the expansion process in the image data D1, the controller 11 specifies the position in the main scanning direction X as "Xstar" and the position in the sub-scanning direction Y as "0."

Figure 11:
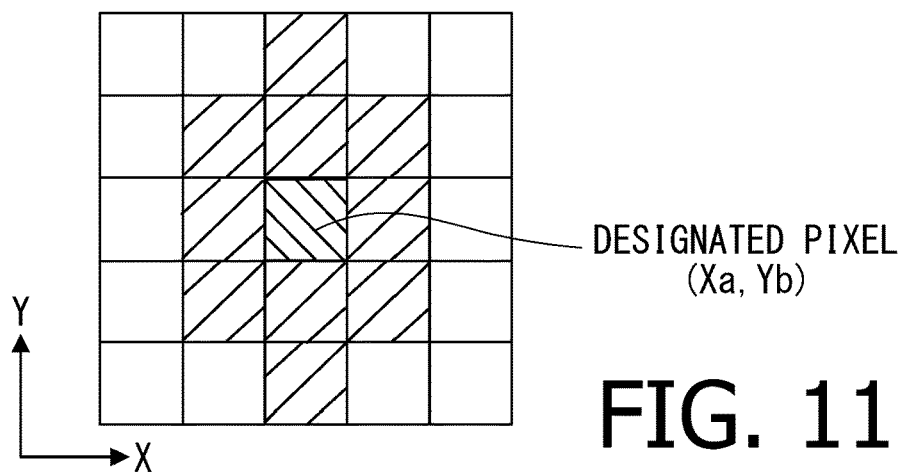
FIG. 11 illustrates the dilation process.

In S61, the controller 11 determines whether the pixel at the coordinates specified in S60 is an edge pixel. When it is determined that the pixel at the specified coordinates is not the edge pixel (S61: NO), the process proceeds to S62. In S62, the controller 11 determines whether or not an edge pixel exists around the designated pixel (X, Y) that was determined not to be an edge pixel in S61. FIG. 11 shows the specific range to determine if there are edge pixels around a designated pixel (Xa, Yb). Specifically, as shown in FIG. 11, the controller 11 determines whether any of the 8 neighboring pixels and additional two pixels located on the plus side and minus side by 2 pixels in the sub-scanning direction Y with respect to the designated pixel (Xa, Yb) are edge pixels. With respect to the designated pixels (Xa, Yb), it is determined whether each of the 8 neighboring pixels (Xa+1, Yb), (Xa−1, Yb), (Xa, Yb+1), (Xa+1, Yb+1), (Xa−1, Yb+1), (Xa, Yb−1), (Xa, Yb−1), (Xa+1, Yb−1), (Xa−1, Yb−1), (Xa−1, Yb−1) and additional two pixels (Xa, Yb+2) and (Xa, Yb−2) which are located on the positive and negative sides by 2 pixels in the sub-scan direction Y is the edge pixel. That is, in S61, edge pixels aligned before and after the specified pixel (X, Y) in the sub-scanning direction Y are more easily detected than edge pixels aligned before and after the main scanning direction X, with respect to the specified pixel (X, Y).

When it is determined that there exist edge pixels around the designated pixel (X, Y) that was determined not to be an edge pixel (S62: YES), the process proceeds to S63. In S63, the designated pixel (X, Y) is converted to the edge pixel (i.e., the grayscale value is set to one). As shown in FIG. 11, among the designated pixels (Xa, Yb), the designated pixels having edge pixels arranged before and after in the sub-scanning direction Y are more likely to be changed to edge pixels. As a result, edge pixels are more likely to be continuously arranged in the sub-scanning direction Y than in the main scanning direction X. After the execution of S63, the process proceeds to S64. It is noted that, when the designated pixel (X, Y) is the edge pixel (S61: YES) or the pixels surrounding the designated pixel (X, Y) are not the edge pixels (S62: NO), the process proceeds to S64 without executing S63.

Figure 12:
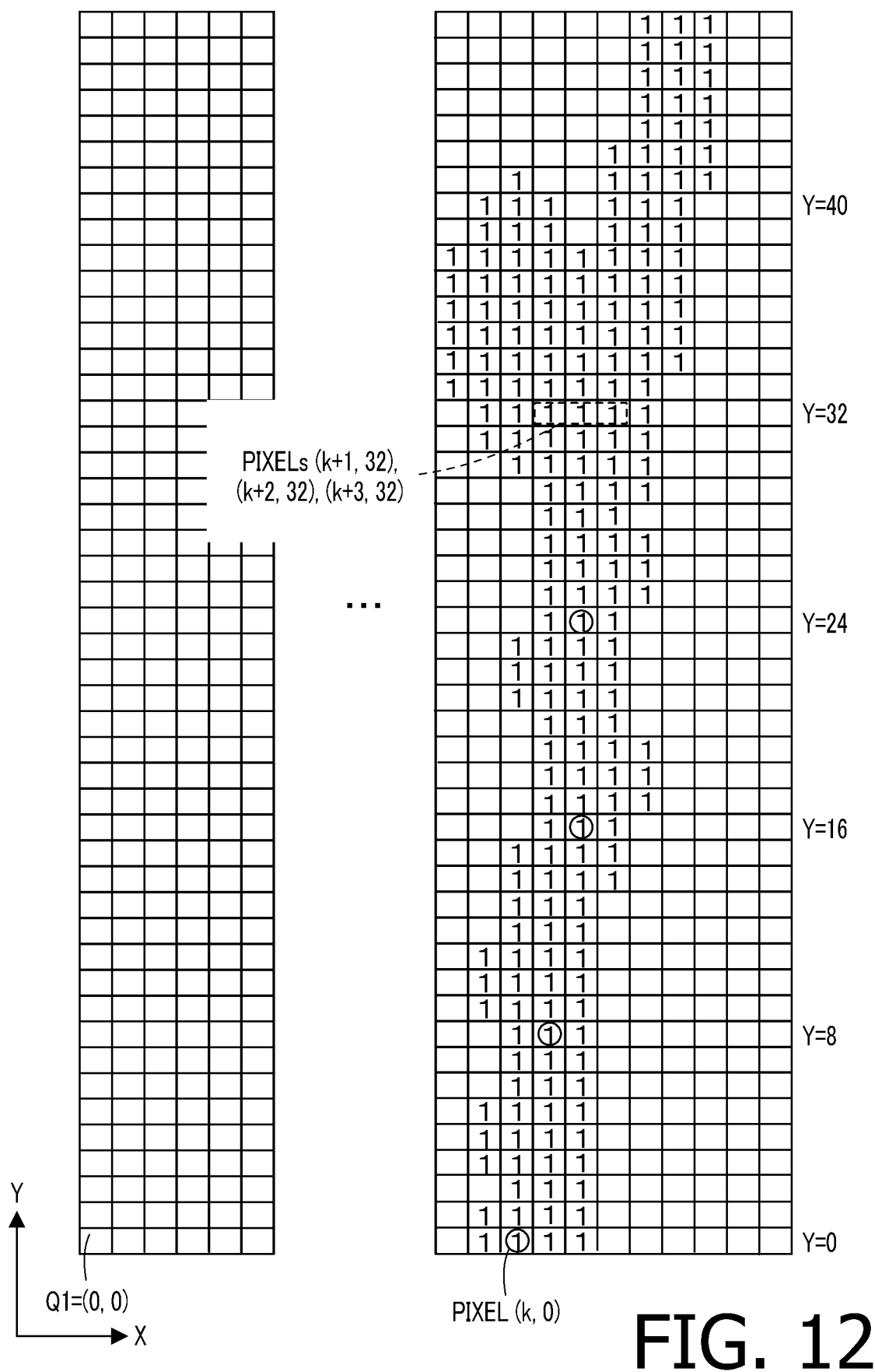
FIG. 12 illustrates a part of image data after the dilation process was applied.

FIG. 12 shows each pixel when the expansion process of S14 is performed on the image data D1 shown in FIG. 5. For ease of explanation, a circle is applied to a value, in FIG. 12, for each of pixels that the controller 11 determined to be the edge pixels with continuity in S29 of FIG. 6.

In S64, the controller 11 determines whether the coordinate, in the main scanning direction X, of the designated pixel is "Xend" or not. That is, controller 11 determines whether the designated pixel (X, Y) is out of the expansion range. When it is determined that the coordinate, in the main scanning direction X, of the designated pixel is not "Xend" (S64: NO), the process proceeds to S66. In S66, the controller 11 changes the coordinate, in the main scanning direction X, of the designated pixel to the plus side by one pixel. After the execution of S66, the process proceeds to S61. In S61, the controller 11 executes a process to determine whether or not the newly designated pixel is an edge pixel.

When it is determined that the coordinate, in the main scanning direction X, of the designated pixel is "Xend" (S64: YES), the process proceeds to S65. In S65, the controller 11 determines whether the coordinate, in the sub-scanning direction Y, of the designated pixel is "Ymax" or not. When it is determined that the coordinate, in the sub-scanning direction Y, of the designated pixel is not "Ymax" (S65: NO), the process proceeds to S67. In S67, the controller 11 changes the coordinate, in the sub-scanning direction Y, of the designated pixel to the plus side by one pixel, and changes the coordinate, in the main scanning direction X, of the designated pixel to "Xstar." Thereafter, the process proceeds to S61, and the processes of S61-S63 are performed on the changed designated pixel (X, Y).

By the above process, the pixels around the right edge pixel are changed to edge pixels (pixels with a grayscale value of 1), and the interruption of the edge pixel in the image data D1 obtained by reading the right edge is resolved. In the example shown in FIG. 5, the pixels (k+1,32), (k+2,32), and (k+3,32) shown by the dashed lines were not determined as the edge pixels, but in the example shown in FIG. 12 where the expansion process has been executed, the pixels (k+1,32), (k+2,32), and (k+3,32) shown by the dashed lines are changed to the edge pixels. In FIG. 12, the pixel (k+4, 32) in the neighborhood of the pixel (k+3, 32) shown by the dashed line is also changed to the edge pixel. When the position of the designated pixel in the sub-scanning direction Y is determined to be "Ymax" at S65, the controller 11 terminates the process in FIG. 10 and proceeds to S11 in FIG. 3.

In S11, the controller 11 executes the right edge detection process again and then proceeds to S12. In the detailed process of S12 shown in FIG. 7, for each candidate point group Gn, the X coordinate difference between the candidate point group Gn and the next candidate point group Gn−1 is evaluated to determine whether the right edge pixel is interrupted. When, in the subsequent step S45, it is determined from the value of the first determination flag that the expansion process has already been executed (S45: YES), the process proceeds to S50.

In S50, it is determined whether the total number of the edge pixels with continuity in the set of candidate point groups Gn, Gn+1, GN stored in RAM is greater than or equal to a second constant γ. In the present embodiment, the second constant γ is a number of decisions that has a different value than the first constant β used in S46. Concretely, the second constant γ is a fixed value regardless of the number of edge pixels in the set of candidate point groups Gn, Gn+1, GN, stored in the RAM.

When it is determined that the total number of the edge pixels with continuity in the set of candidate point groups Gn, Gn+1, . . . , and GN stored in RAM is greater than or equal to the second constant γ (S50: YES), the process proceeds to S49. In S49, the controller 11 sets the second determination flag to a value indicating that the edge pixel was properly detected. On the other hand, when it is determined that the total number of the edge pixels with continuity in the set of candidate point groups Gn, Gn+1, . . . , and GN stored in RAM is less than the second constant γ (S50: NO), the process proceeds to S51. In S51, the controller 11 sets the second determination flag to a value indicating that the edge pixel was not properly detected. Thereafter, the process proceeds to S13 in FIG. 3.

In S13, the controller 11 determines whether the expansion process is necessary. Concretely, when the first determination flag does not have a value indicating that the "expansion process is required" (S13: NO), the process proceeds to S15. In S15, the controller 11 determines whether the edge pixel was properly detected. Concretely, when the second determination flag has a value indicating that the edge pixel was properly detected (S15: YES), the process proceeds to S16.

In S16, the controller 11 calculates an approximate straight line of a right edge in the original document area Dm using the coordinates of the right edge pixels in the set of detected candidate point groups Gn, Gn+1, . . . , and GN. Concretely, by performing a linear approximation of the coordinates of the right edge pixels contained in the set of candidate point groups Gn, GN+1, . . . , and GN stored in the RAM, the controller 11 calculates the approximate straight line representing the right edge L1 in the original document area Dm. For example, the approximate straight line of the right edge L1 is calculated as a line represented by an equation Y=AX+B.

Figure 13:
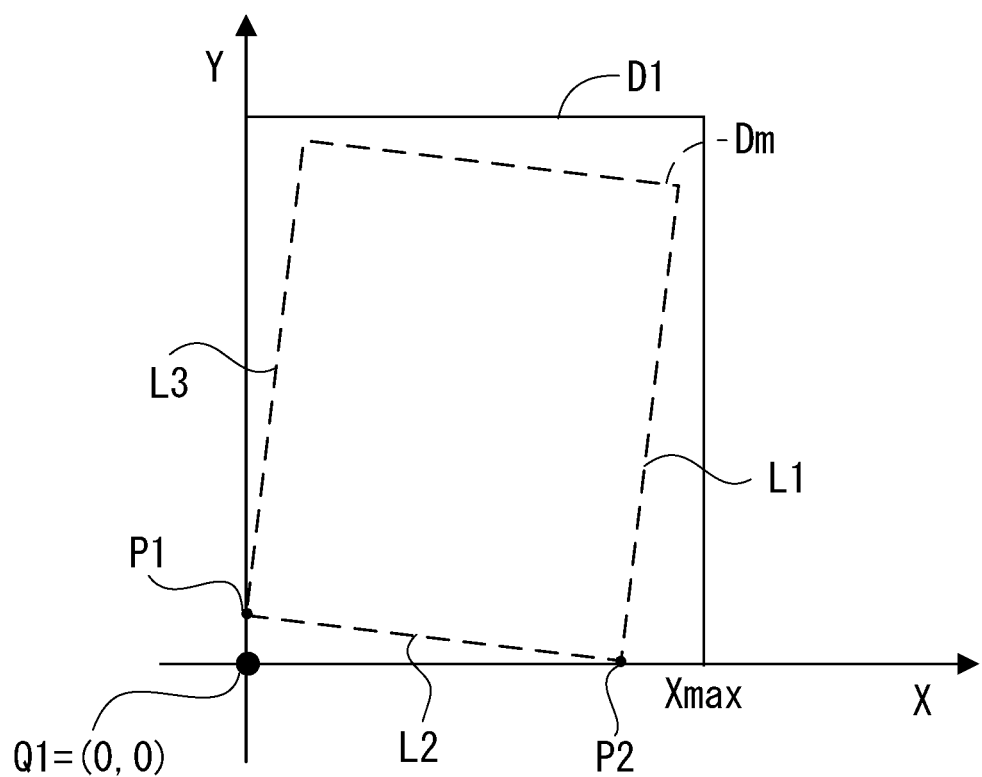
FIG. 13 illustrates a calculation of approximate straight lines.

In S17, using the approximate straight line of the right edge calculated in S16, the controller 11 calculates an approximate straight line of the lower edge L2, which is configured by the lower edge pixels, of the original document area Dm. The lower edge pixels are the edge pixels obtained by reading the upper edge of the original document M. In FIG. 13, the inclination of the normal to the approximate straight line indicating the right edge L1 of the original document area Dm can be calculated as "−1/A." Furthermore, the intersection point P2 of the approximate straight line representing the right edge L1 and a line segment passing through the origin Q1 and parallel to the main scanning direction X can be calculated as "−b/a." In the present embodiment, by estimating the intersection point P2 as the pixel obtained by reading a non-reference corner, which is one of the four corners in the original document area Dm, an approximate straight line of the lower edge L2 that is orthogonal to the approximate straight line representing the right edge L1 and passes through the intersection point P2 can be calculated as "Y=−(1/A)X−(B/A²)."

In S18, using the approximate straight lines calculated in S16 and S17, an approximate straight line representing the left edge L3, which is configured by the left edge pixels in the original document area Dm, is calculated. In the example in FIG. 13, the intersection point P1 of the lower edge L2 and the line segment passing through the origin Q1 and parallel to the sub-scanning direction Y can be calculated as "−B/A." In the present embodiment, by estimating the intersection point P2 as the pixel obtained by reading a reference corner, which is one of the four corners in the original document area Dm, an approximate straight line representing the lower edge L2 that is parallel to the approximate straight line representing the right edge L1 and passes through the intersection point P2 can be calculated as "Y=−AX−(B/A²)." The reference corner is the corner of the original document M that is set on the original document table 30 and is located near the butt position 31. The non-reference corner is the corner located on the opposite side in the main scanning direction X with respect to the reference corner in the original document M.

In S19, using the approximate straight lines calculated in S16, S17 and S18, the controller 11 calculates an original document size indicating the size of the original document M and an inclination amount of the original document M. Concretely, the distance from the intersection point P1 to the intersection point P2 is used as the length dimension of the short edge in the original document area Dm to determine the document size. Further, based on an inclination A of the approximate straight line representing the right edge L1, the inclination amount of the original document M is calculated.

When it is determined that the edge pixel was not properly detected (S15: NO), the process proceeds to S20. In S20, the controller 11 sets the document size to the "maximum size" and the inclination amount of the original document M to "0°." This is to ensure that the original M is recorded on a sheet or other media as much as possible by setting the document size to the maximum size that can be set by the image reading device 10 when the document size is unknown. It is noted that the processes performed by the controller in S16 to S20 are examples of image processing.

After completing S19 or S20, the controller 11 terminates the process shown in FIG. 3. When the reading of the document M up to the rear end is completed, the controller 11 terminates the repeated reading operation by the image sensor 12 and the conveying operation of the image sensor 12 by the conveying mechanism 19.

The controller 11 then performs an inclination correction on the image data D2 stored in the RAM by adjusting the inclination of the original document area Dm. In the inclination correction, the controller 11 corrects the inclination of the original document area Dm contained in the image data D2 using the inclination amount calculated in S19 or S20 in FIG. 3. It is noted that the inclination correction performed by controller 11 is an example of image processing.

Furthermore, when the automatic enlargement/reduction function is set to "ON," the controller 11 extracts the original document area Dm from the image data D2 stored in the RAM and changes the size of the extracted original document area Dm to match the specified sheet size. In this process, the controller 11 calculates intersection points, in the original document area Dm, of the approximate straight lines, including points P1 and P2, from the approximate straight line representing the right edge L1, the approximate straight line representing the left edge L3, and the approximate straight line representing the lower edge L2, which are calculated in S16-S18 of FIG. 3. Then, the calculated intersection points, as well as the location information of each edge L1, L2, and L3 of the original document area Dm, are used to extract the original document area Dm from the image data D2. Then, the size of the extracted original document area Dm is enlarged/reduces in accordance with the specified sheet size. That is, the enlargement/reduction process of the original document area Dm performed by the controller 11 is an example of image processing.

In the present embodiment described above, the following effects can be achieved. The controller 11 of the image reading device 10 detects edge pixels from the image data D1 obtained by reading with the image sensor 12. The controller 11 determines whether there is an interruption of the sequence of the detected edge pixels in a particular direction. When an edge pixels are determined to be interrupted, then controller 11 performs an expansion process to increase the number of edge pixels in a specific range near the detected edge pixels in the image data. The controller 11 performs a particular process on the image data D1 using the edge pixels detected from the image data D1 after the expansion process. In this way, image processing can be properly performed on the image data D1 even if some of the edge pixels that indicate the outline of the original document M cannot be detected.

The controller 11 of the image reading device 10 searches the image data, which is obtained by reading with the image sensor 12, in the main scanning direction X to detect edge pixels that are aligned in the sub-scanning direction Y among edge pixels. The controller 11 executes the expansion process to increase the number of edge pixels for a specific range near the detected edge pixels in the image data D1. In the expansion process performed by controller 11, for a specific range, the number of edge pixels in the sub-scanning direction Y is increased more than the number of edge pixels in the main scanning direction X. In this way, when an edge pixel interruption is determined, the number of edge pixels in the specified range is increased such that the increased number of edge pixels in the sub-scanning direction Y is greater than the increased number of edge pixels in the main scanning direction X. As a result, the increase of edge pixels in the main scanning direction X is more limited than the increase of edge pixels in the sub-scanning direction Y, thereby preventing reduction of detection accuracy due to connection of edge pixels obtained by reading noises and by reading the outline of the document, while enabling wide expansion of edge pixels in the sub-scanning direction Y so that there is no interruption.

On the original document table 30, the original document M is placed such that the reference corner of the original document is located at the butt position 31, which is a particular position of the original document table 30. The controller 11 detects edge pixels obtained by reading an edge of the original document M extending from the non-reference corner of the four corners in the sub-scanning direction Y. Then, the controller performs processing on the image data based on the position of the edge pixels of which particular position on the image data is Q1. In this way, when the image processing using the edge pixels obtained by reading an edge of the original document M is executed, the effect of the edge pixel interruption can be suppressed and the image processing can be performed properly.

The controller 11 detects a plurality of edge pixels in units of a candidate point group Gn, which is a collection of edge pixels. The controller 11 determines whether the edge pixels are interrupted based on whether the number of edge pixels in candidate point groups Gn which are aligned in the main scanning direction X at intervals which is smaller than a threshold a, and aligned next to each other in the sub-scanning direction Y. When the detection is performed in units of the candidate point group Gn, which is a collection of multiple edge pixels, misdetection of dust or the like as the contours of the original document M may be suppressed compared to a case where the edge pixels are detected in units of a pixel, but interruption of edge pixels may likely occur. In such a case, according to the present embodiment, the effect of the interruption of the edge pixels is suppressed, and image processing on the image data can be performed properly.

The controller 11 re-detects the candidate point groups Gn using the edge pixels re-detected from the image data after the expansion process is executed. Based on whether or not the number of edge pixels contained in the re-detected candidate point groups of which the interval in the main scanning direction X is shorter than the threshold value α and which are arranged next to each other in the sub-scanning direction Y is less than the second constant γ, the controller 11 again determines whether or not there is an interruption of edge pixels. In this way, the presence or absence of edge pixel interruptions is determined even after the expansion process is performed.

Before the expansion process is executed, the controller 11 determines whether or not there is an edge pixel interruption based on whether or not the number of edge pixels in the detected candidate point group Gn is equal to or greater than the first constant β. After the expansion process is executed, the controller 11 determines whether or not there is an edge pixel interruption based on whether or not the number of edge pixels in the detected candidate point group Gn is equal to or greater than the second constant γ. The second constant γ is a different determination number than the first constant β. In this way, the number of determinations to determine whether edge pixels are interrupted before and after the expansion process is executed is different, allowing proper determination of the presence or absence of an interruption.

The controller 11 calculates an approximate straight line of the edge of the original document M based on the position of the edge pixel relative to the origin Q1 in the image data, and performs an inclination correction process on the image data based on the calculated approximate straight line. In this way, the inclination of the image data can be properly corrected when the edge pixels are used to correct the inclination.

The controller 11 performs a process to specify the document size of the image data based on the position of the edge pixels relative to the origin Q1 on the image data. Therefore, even when the edge pixels are used to specify the document size, the document size can still be determined properly.

OTHER EMBODIMENTS

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

The technology disclosed in the present embodiment is not limited to the embodiment as described above, but can be modified into various forms to the extent that it does not depart from aspects of the present disclosures. For example, the following modifications are possible.

In the embodiment described above, the controller 11 calculated the approximate straight line for the right edge and used the approximate straight line to calculate the approximate straight lines for the left edge and the lower edge. Instead, the controller 11 may detect, in S17 of FIG. 3, the lower edge pixels from the image data D1, and the detected lower edge pixels may be used to calculate the approximate line for the lower edge in the original document area Dm. Furthermore, in S18, the controller 11 may detect the left edge pixels of the image data D1 and the detected left edge pixels may be used to calculate an approximate straight line for the left edge of the original document area Dm.

In the embodiment described above, the presence or absence of edge pixel interruption was determined twice, before and after the execution of the expansion process. Alternatively, after the expansion process is performed, the presence or absence of edge pixel interruptions may not be determined. In such a case, when the controller 11 determines in S45 of FIG. 7 that the expansion process has already been executed, the controller 11 proceeds directly to S49. The controller 11 then makes a positive decision on S15 in FIG. 3, and performs S16 through S19. In this case, the process of S20 in FIG. 3 and the processes of S50, S51 in FIG. 7 may be omitted.

In the embodiment described above, the presence or absence of an edge pixel interruption was determined on the basis of a candidate point group including eight edge pixels aligned in the sub-scanning direction Y at every eight pixels. The number of edge pixels constituting the candidate point group and the interval of edge pixels in the sub-scanning direction Y are not limited to the number indicated in the embodiment described above and may be changed as appropriate. Furthermore, the presence or absence of an edge pixel break may be determined by using one edge pixel adjacent to another edge pixel in the sub-scanning direction Y as a unit.

In the embodiment described above, edge pixels were detected from the inspection range in the image data D1. Alternatively, edge pixels may be detected from the entire image data D1. In such a case, the inspection range is not set in S10 of FIG. 3.

In the embodiment described above, the conveying mechanism 19 reciprocates the image sensor 12 in the sub-scanning direction Y, thereby changing a positional relationship between the image sensor 12 and the original document M being changed relatively. Alternatively, the conveying mechanism 19 may be provided with an ADF (auto document feeder) and the positional relationship between the image sensor 12 and the original document M may be changed relatively by conveying the original document with the ADF.

The ADF typically has a tray in which the original document M is set and rollers configured to convey the original document set in the tray. The document M conveyed from the tray by the rollers passes through a reading position facing a reading surface of the image sensor 12 provided inside the housing. The image sensor 12 is configured to read the document M passing through the reading position at predetermined intervals according to the set resolution and outputs the read data to the AD converter 13.

In the embodiment described above, the right edge pixels of the original document area Dm in the image data D1 were detected to determine the edge pixel interruptions. Alternatively, the edge pixels on the left edge or the lower edge of the original document area Dm may be detected to determine the edge pixel interruptions. In such a case, right edge pixels or lower edge pixels are detected in the inspection range at S11 in FIG. 3. In S12, the presence or absence of interruption is determined for the edge pixels detected in S11.

What is claimed is:

1. An image reading device, comprising:
an original document table;
a reading sensor configured to read an area extending in a main scanning direction of an original document placed on the original document table and output image data representing the area extending in the main scanning direction;
a conveying mechanism configured to move the original document and the reading sensor relative to each other in a sub-scanning direction which is orthogonal to the main scanning direction;
a storage configured to accumulatively store the image data output by the image sensor as the original document and the reading sensor are moved relative to each other by the conveying mechanism; and
a controller configured to perform:
detecting, by executing an edge detection process, edge pixels from the image data stored in the storage, the edge pixels being pixels obtained by reading an edge of the original document,
determining whether a sequence of the detected edge pixels in a particular direction is interrupted;
increasing, by executing an expansion process, the edge pixels in a particular range in a neighborhood of the detected edge pixels of the image data when the sequence of the edge pixels is determined to be interrupted; and
performing a particular process on the image data using the edge pixels detected from the image data after the edge pixels are increased.

2. The image reading device according to claim 1,
wherein the controller is configured to perform:
detecting the edge pixels arranged along the edge of the original document from among the edge pixels by inspecting the image data stored in the storage in the main scanning direction in the detecting; and
increasing the edge pixels, in the increasing, such that a number of increased edge pixels in the sub-scanning direction is greater than a number of increased edge pixels in the main scanning direction for the particular range.

3. The image reading device according to claim 2,
wherein a rectangular original document is placed on the original document table such that one of four corners of the rectangular original document is located at a particular position on the original document table, and
wherein the controller is configured to perform:
detecting the edge pixels obtained by reading the original document along an edge thereof from a particular position side along the sub-scanning direction in the detecting; and
applying an image processing on the image data based on the position of edge pixels, the edge pixels being edge pixels, among the detected edge pixels, obtained by reading the edge of the original document.

4. The image reading device according to claim 3, wherein the controller is configured to perform:
calculating an approximate straight line representing an edge of the original document based on positions of the edge pixels relative to an origin defined on the original document table on the image data; and
applying correction of an inclination to the image data based on the calculated approximate straight line.

5. The image reading device according to claim 3, wherein the controller is configured to perform identifying a size of the original document based on positions of the edge pixels relative to the origin of the original table on the image data.

6. The image reading device according to claim 2, wherein the controller is configured to perform:
setting an area extending in the main scanning direction by a particular number of pixels with respect to the detected edge pixels as the particular area; and
increasing the edge pixels within the set particular area in the expansion process in the increasing.

7. The image reading device according to claim 6, wherein the controller is configured to perform:
re-detecting the candidate point groups using the edge pixels detected from the image data in the detecting after the increasing; and
determining presence or absence of the interruption of the edge pixels again based on whether or not the total number of edge pixels included in the set of the candidate point groups of which interval in the main scanning direction is smaller than an amount for a particular number of pixels, and which are arranged next to each other in the sub-scanning direction is equal to or less than the determination number in the determining the interruption.

8. The image reading device according to claim 7, wherein the controller is configured to perform:
determining, in the determining the interruption, presence or absence of the interruption of the edge pixels based on whether or not a total number of edge pixels contained in the set of the candidate point groups as detected is equal to or greater than a first determination number before performing the increasing, the first determination number being the determination number;
determining, in the detecting the interruption, presence or absence of the interruption of the edge pixels based on whether or not a total number of edge pixels contained in the set of the candidate point groups as re-detected in the re-detecting after performing the increasing, the second determination number being the determination number different from the first determination number.

9. The image reading device according to claim 1, wherein the controller is configured to perform:
detecting the edge pixels in units of a candidate point group in the detecting, the candidate point group being a group of multiple edge pixels arranged along the edge of the original document; and
determining whether a sequence of the edge pixels is interrupted based on whether a total number of the edge pixels in a set of the candidate point groups of which an interval in the main scanning direction is shorter than an amount of a particular number of pixels, and which are arranged next to each other in the sub-scanning direction is equal to or less than a particular determination number in the determining.

10. The image reading device according to claim 9, wherein the controller is configured to perform:
setting an area including the edge pixels contained in the candidate point groups of which interval in the main scanning direction is shorter than the amount of the particular number of pixels, and which are arranged next to each other in the sub-scanning direction, as the particular range; and
increasing the edge pixels for the particular range as set in the increasing.

11. An image reading device, comprising:
an original document table;
a reading sensor configured to read an area extending in a main scanning direction of an original document placed on the original document table and output image data representing the area extending in the main scanning direction;
a conveying mechanism configured to move the original document and the reading sensor relative to each other in a sub-scanning direction which is orthogonal to the main scanning direction;
a storage configured to accumulatively store the image data output by the image sensor as the original document and the reading sensor are moved relative to each other by the conveying mechanism; and
a controller configured to perform:
detecting edge pixels aligned along an edge of the original document from among edge pixels by inspecting image data stored in the storage, the edge pixels being pixels obtained by reading an edge of the original document;
increasing, by executing an expansion process, the edge pixels in a particular range in a neighborhood of the detected edge pixels of the image data, a number of increased edge pixels in the sub-scanning direction being greater than a number of increased edge pixels in the main scanning direction for the particular range in the expansion process; and
performing a particular process on the image data using the edge pixels detected from the image data after the edge pixels are increased.

12. An image reading device according to claim 11, wherein the controller is configured to perform:
setting an area extending in the main scanning direction by a particular number of pixels with respect to the detected edge pixels as the particular area; and
increasing the edge pixels within the set particular area in the expansion process in the increasing.

* * * * *